United States Patent [19]
Mizuno et al.

[11] Patent Number: 5,663,620
[45] Date of Patent: Sep. 2, 1997

[54] APPARATUS FOR CONTROLLING DRIVING OF POWER WINDOW SYSTEM

[75] Inventors: Hiromitsu Mizuno; Shuichi Kawase; Yukio Iwasaki, all of Aichi-ken, Japan

[73] Assignee: Tokai-Rika-Denki Seishkusho Kabushiki Kaisha, Aichi-ken, Japan

[21] Appl. No.: 608,037

[22] Filed: Feb. 28, 1996

Related U.S. Application Data

[63] Continuation of Ser. No. 508,424, Jul. 31, 1995, abandoned, which is a continuation of Ser. No. 101,058, Aug. 4, 1993, abandoned.

[30] Foreign Application Priority Data

Aug. 7, 1992 [JP] Japan ..................... 4-211175

[51] Int. Cl.⁶ .................................................. H02P 3/06
[52] U.S. Cl. ................. 318/283; 318/286; 318/287; 318/282; 318/466
[58] Field of Search ..................... 318/260–293, 318/460–466, 467, 469, 490; 49/28; 361/28–31; 364/424

[56] References Cited

U.S. PATENT DOCUMENTS

| | | | |
|---|---|---|---|
| 4,608,637 | 8/1986 | Okuyama et al. | 364/424 |
| 4,611,154 | 9/1986 | Lambropoulos et al. | 318/490 |
| 4,641,067 | 2/1987 | Iizawa et al. | 318/287 |
| 4,686,598 | 8/1987 | Herr | 361/31 |
| 4,709,196 | 11/1987 | Mizuta | 318/282 |
| 4,962,337 | 10/1990 | Creed | 318/280 |
| 4,983,896 | 1/1991 | Sugiyama et al. | 318/286 |

FOREIGN PATENT DOCUMENTS

| | | |
|---|---|---|
| A-148318 | 7/1985 | European Pat. Off. . |
| A3332813 | 3/1985 | Germany . |

Primary Examiner—Paul Ip
Attorney, Agent, or Firm—Hazel & Thomas

[57] ABSTRACT

An apparatus for controlling driving of a power window system having a motor drive current detection device for detecting a current flowing through the motor when the door glass is raised by the motor, a current variation calculation device for calculating a variation amount of the current detected by the motor drive current detection device, and a drive control device for stopping or reversing the motor when the variation-amount of the current exceeds a predetermined value and the gradient of the variation amount of the current is positive when the variation of the current starts. The apparatus can quickly and accurately judge whether an abnormal current is caused by noises or the squeeze of an alien substance, thereby eliminating unnecessary operations of the motor.

16 Claims, 6 Drawing Sheets

APPARATUS FOR CONTROLLING DRIVING OF POWER WINDOW SYSTEM

This application is a continuation of application Ser. No. 08/508,424, filed Jul. 31, 1995, which is a continuation of application Ser. No. 08/101,058, filed Aug. 4, 1993, both now abandoned.

BACKGROUND OF THE INVENTION

1. Field of the Invention

The present invention relates to an apparatus for controlling the driving of a power window system in which the door glass of a vehicle is raised and lowered by the driving power of a motor. The auto switch is a switch for automatic operation (hereinafter reffered to as "auto switch").

2. Description of the Related Art

At a location near the driver's seat, there are provided manual switches and an auto switch as switches for the power window system.

When the driver manipulates the auto switch to bring the contacts for the raising operation or the contacts for the lowering operation into the ON state, the drive of the motor is continued until the door grass is completely closed or completely opened even after the driver releases the auto switch. When the door glass is completely closed, the movement of the door glass is prevented by the window frame or the like, whereby the drive current of the motor increases. The drive of the motor is stopped when the drive current exceeds a predetermined level.

By the way, it has been considered to detect an abnormal current due to the existence of a foreign object or substance on the locus of the upward movement of the door glass so as to stop or reverse the motor. In some systems, there is provided a full-closure detecting switch for detecting the state of the door glass approaching its full closure position so as to discriminate a current increase due to the foreign object of substance of a current increase due to the full closure of the door glass.

However, the detected drive current of the motor also becomes abnormal due to vibrations and noises so that the variation amount of the drive current exceeds a predetermined level. The vibrations are generated, for example, when the vehicle runs on a bumpy road, when the wheels of the vehicle fall into a depression on the road, or when a door is violently closed. Noise is generated, for example, when the engine is started.

Therefore, there has been a problem that noise is erroneously recognized as the presence of a foreign object or substance, even though the squeeze of the alien substance does not actually exist, and the motor is stopped or reversed.

SUMMARY OF THE INVENTION

Accordingly, it is an object of the present invention to provide an improved apparatus for controlling driving of a power window system, which is capable of quickly and accurately Judging whether an abnormal current is caused by noise or the presence of a foreign object or substance, to thereby eliminate unnecessary operations of the motor.

To this end, the present invention provides an improved apparatus for controlling the driving of a power window system in which the door glass of a vehicle is raised and lowered by the driving power of a motor. The apparatus includes motor drive current detection means for detecting a current flowing through the motor when the door glass is raised by the motor, current variation amount obtaining means for obtaining a variation amount per unit of the current detected by the motor drive current detection means, and drive control means for stopping or reversing the motor when the variation amount of the current exceeds a predetermined value and the variation amount of the current is positive when the variation of the current starts.

Further, the present invention provides an improved method of driving and controlling a power window system in which a door glass of a vehicle is raised and lowered by the driving power of a motor. The method comprises the steps of detecting a current flowing through the motor when the door glass is raised by the motor, obtain a variation amount per unit time of the detected current, and stopping or reversing the motor when the variation amount of the current exceeds a predetermined value and the variation amount of the current is positive when the variation of the current starts.

According to the present invention, the driving current of the motor is detected by the motor drive current detection means, and a variation amount of the detected drive current is obtain by the current variation amount obtaining means. When the variation amount of the drive current exceeds a predetermined value, the drive current is regarded as abnormal.

Here, vibrations or noise can be mentioned as causing the occurrence of a condition where the variation amount of the drive current exceeds a predetermined level. The vibrations are generated, for example, when the vehicle travels on a bumpy road, when the wheels of the vehicle fall into a depression on the road, or when a door is violently closed. Noise is generated, for example, when the engine is started.

Figure 3:
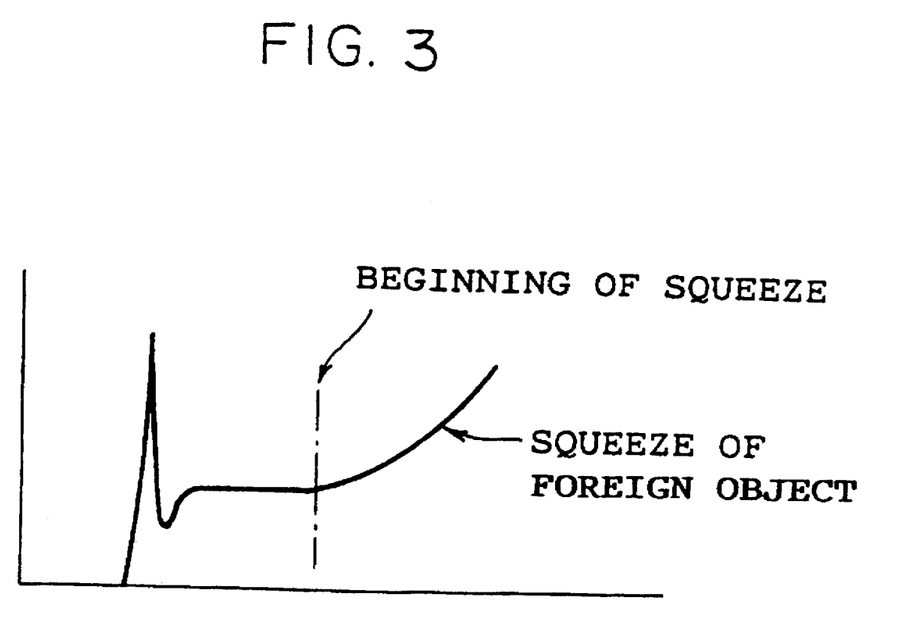
FIG. 3 is a characteristic chart showing the drive current of the motor of the apparatus for driving and controlling the power window system when a foreign object of substance is squeezed.
Figure 4:
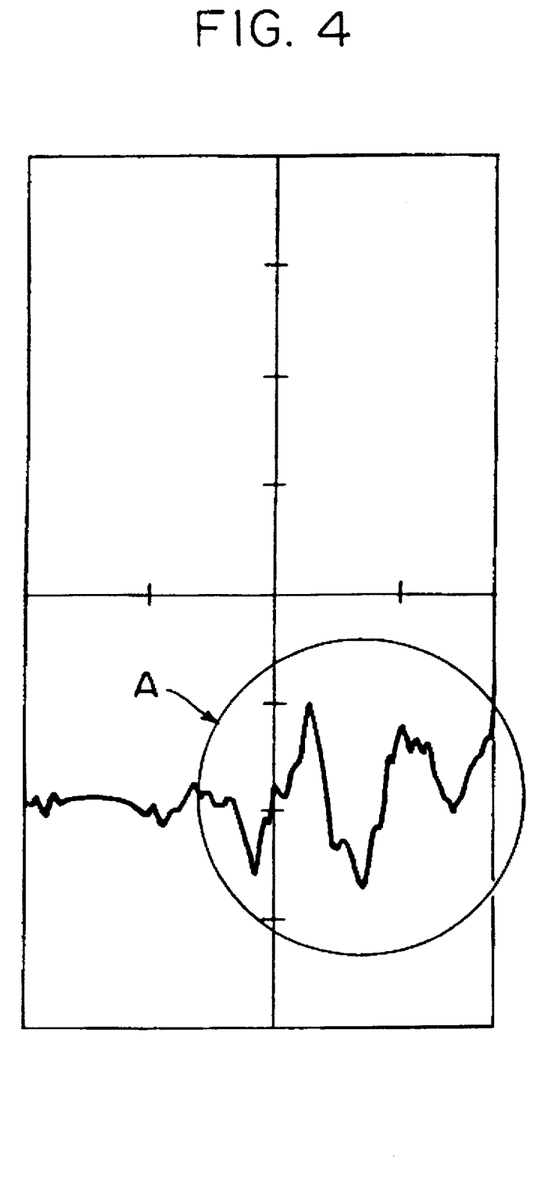
FIG. 4 is a characteristic chart showing the waveform of the motor current when the vehicle runs on a bumpy road while the door glass is being raised.
Figure 5:
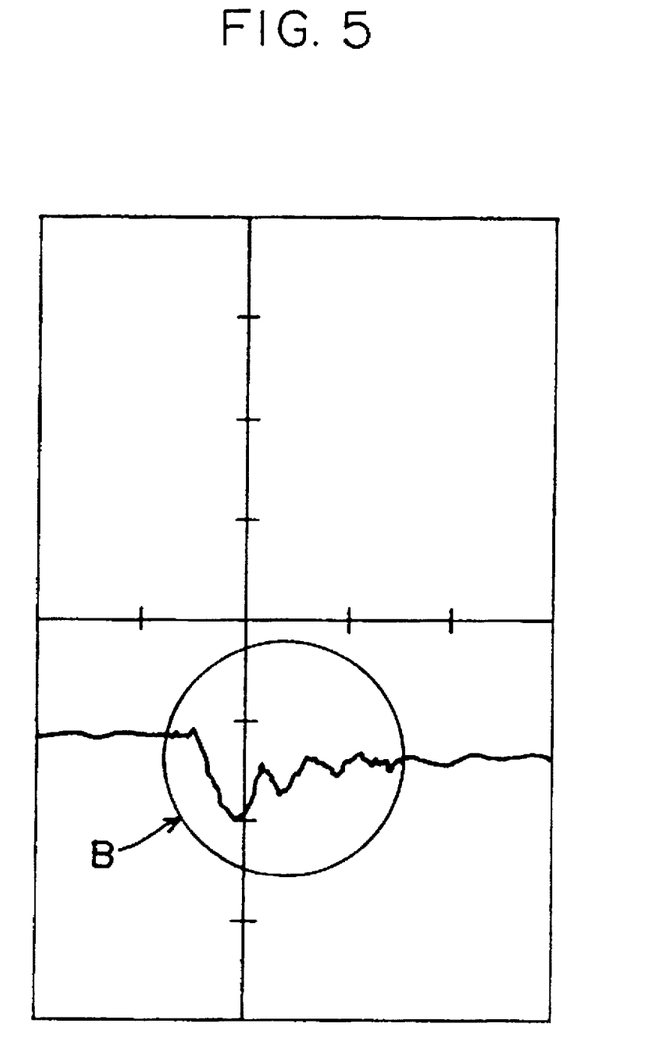
FIG. 5 is a characteristic chart showing the waveform of the motor current when the door is violently closed while the door glass is being raised.
Figure 6:
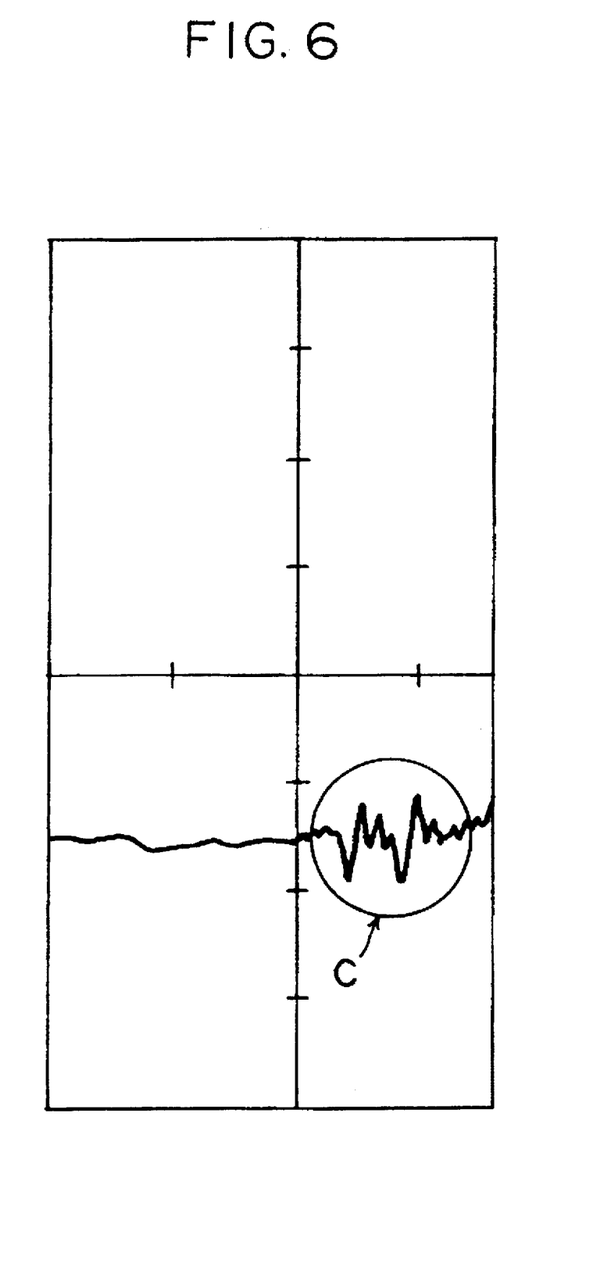
FIG. 6 is a characteristic chart showing the waveform of the motor current when the wheels of the vehicle fall into depression on the road while the door glass is being raised.

However, the waveform of the abnormal current caused by noise demonstrates a common characteristic in which the current varies in the negative direction (i.e., variation amount becomes negative) at the beginning of the variation, as shown by the arrow A in FIG. 4, the arrow B in FIG. 5 and the arrow C in FIG. 6. On the other hand, the waveform of the abnormal current caused by the squeezing of a foreign object or substance demonstrates a characteristic in which current varies in the positive direction (i.e., the variation amount becomes positive), as shown in FIG. 3.

Therefore, in the present invention, when an abnormal current is detected, it is judged whether the variation amount is positive or negative, and it is then judged whether the abnormal current is caused by the squeezing of a foreign object or substance only when the variation amount is positive, so as to stop or reverse the motor by the drive control means. Further, when the variation amount is negative, it is recognized that the abnormal current is noise, and the operation for obtaining the abnormal current is stopped. Therefore, it becomes possible to detect only abnormal current which is caused by the presence of foreign objects or substances.

Further, it is better to continuously stop the operation for obtaining the abnormal current for a predetermined period of time, because the noise or vibrations continue for a while.

As explained above, the apparatus for driving and detecting a power window system according to the present invention can quickly and accurately judge whether an abnormal current is caused by the presence of a foreign object or substance or caused by noise. Therefore, the present invention has the advantage of eliminating unnecessary operation of the motor.

DETAILED DESCRIPTION OF THE PREFERRED EMBODIMENT

Figure 1:
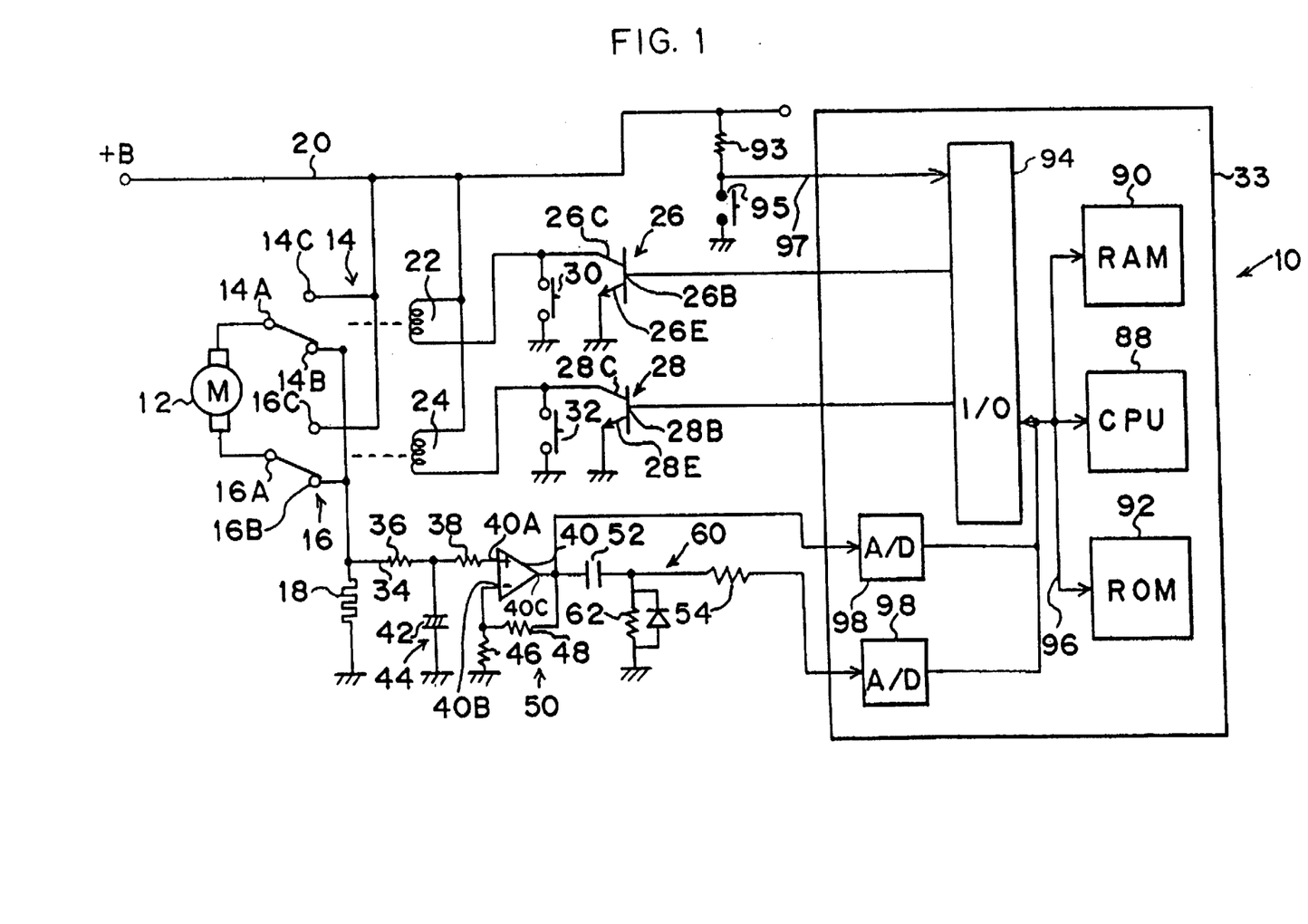
FIG. 1 is a circuit diagram showing an apparatus for controlling the driving of a power window system according to one embodiment.

FIG. 1 shows a circuit diagram of an apparatus for controlling the driving of a power window system according to one embodiment of the present invention.

Both terminals of a motor 12 for the power window drive are connected to the common terminals 14A and 16A of relay circuits 14 and 16 (double contact type), respectively. The first relay circuit 14 is used for raising the door glass, and the first contact 14B thereof is connected to a ground through a resistor 18 having a minute resistance (about 10 m). The second contact 14C is connected to a power line 20. When the first coil 22 is not excited, the movable contact connected to the common terminal 14A is in contact with the first contact 14B. When the first coil 22 is excited, the movable contact switches over to contact the second contact 14C.

Meanwhile, the second relay circuit 16 is used for lowering the door glass, and the first contact 16B thereof is connected to the ground through the resistor 18 of the minute resistance. The second contact 16C is connected to the power line 20. When the second coil 24 is not excited, the movable contact connected to the common terminal 16A is in contact with the first contact 16B. When the second coil 24 is excited, the movable contact is switched over to contact the second contact 16C.

One end of each of the first and second coils 22 and 24 is connected to the power line 20, while the other of each coil is respectively connected to the collector terminals of the first and second transistors 26 and 28 (NPN type).

To a connection line between the first coil 22 and the first transistor 26, one terminal of a manual switch 30 the raising operation is connected, while the other terminal thereof is connected to ground. Accordingly, when the manual switch 30 for the raising operation is brought into its ON-state, the first coil 22 is excited thereby establishing the contact between the movable contact of the first relay circuit 14 and the second contact 14C thereof, whereby the motor 14 rotates in the forward direction to raise the door glass.

Also, to a connection line between the second coil 24 and the second transistor 28, one terminal of a manual switch 32 for the lowering operation is connected, while its other terminal is connected to ground. Accordingly, when the manual switch 32 for the lowering operation is brought into its ON-state, the second coil 24 is excited, thereby establishing the contact between the movable contact of the second relay circuit 16 and the second contact 16C thereof, whereby the motor 14 is rotated in the reverse direction to lower the door glass.

Both the emitter terminals 26E and 28E of transistors 26 and 28 are connected to the ground, while their base terminals 26B and 28B are connected to a controller 33. The controller 33 is constituted to supply the respective base terminals 26B and 28B with predetermined signals. In response to these signals, electric currents start to flow from the collector terminals 26C and 28C of the transistors 26 and 28 to their emitter terminals 26E and 28E, whereby these transistors 26 and 28 are individually brought into the ON-state. Namely, these transistors 26 and 28 have the same functions as those of the manual switches 30 and 32.

From one side of the resistor 18 of minute resistance closer to the power line 20, a signal line 34 is branched for detecting the current flowing through the motor 12. The signal line 34 is connected to the non-inverted input terminal 40A of an amplifier 40 via resistors 36 and 38. To the line between the resistors 36 and 38, one terminal of an electrolytic condenser 42 is connected while the other terminal thereof is connected to ground so as to form a filter portion 44. The inverted input terminal 40B of the amplifier 40 is connected to ground through a resistor 46. Further, the output terminal 40C is connected to the inverted input terminal 40B via a feedback resistor 48 to form an amplifying circuit 50.

Further, the output terminal 40C of the amplifier 40 is connected to the controller 33 through a condenser 52 and a resistor 54. Since a differentiating circuit 60 is formed by the condenser 52 and the resistor 62, the differential waveform of the drive current of the motor 12 is inputted to the controller 33.

Further, another signal line is connected between the output terminal 40C and the controller 33 so that the signal from the output terminal 40C is led directly to the controller 33.

The controller 33 is composed of a CPU 88, a RAM 90, a ROM 92, an input/output port 94 and a bus line 96 including a data bus, a control bus and the like which connect the above components to each other.

The drive current of the motor 12 and the differential component thereof are inputted to the controller 33 through A/D converters 98. The input/output port 94 outputs signals for turning on the above-mentioned transistors 26 and 28, respectively.

Further, an automatic operation signal is inputted to the input/output port 94 for commanding the controller 33 to automatically raise or lower the door glass. The automatic operation signal is outputted from an auto switch 95 of a normally-open type through a branch line 97. One terminal of the auto switch 95 is connected to the power line 20 through a resistor 93, while the other terminal thereof is connected to the ground. The branch line 97 is connected to the line between the resistor 93 and the auto switch 95. Namely, when the auto switch 95 is in the ON state (operating state), no current flows to the branch line 97. When the auto switch 95 is in the OFF state (non-operating state), a current flows to the branch line 97. The auto switch 95 is mechanically connected to the manual switch 30 for the raising operation and to the manual switch 32 for the lowering operation in such a way, that when the manual switch 30 is moved by the driver by a small stroke, the manual switch 30 is brought into the ON state but the auto switch 95 is not brought into the ON state. When the manual switch 30 is moved by a large stroke, both the manual switch 30 and auto switch 95 are brought into the ON state.

The controller 83 continuously outputs an ON signal to the transistor 26 or 28 if once the auto switch 95 is brought into the ON state. With this operation, the raising or lowering of the door glass can be continued even after the driver releases the auto switch 95.

In the RAM 90, there is memorized a threshold value which is used for the comparison with the drive current of the motor 12, which is inputted to the CPU 88 through the A/D convertor 98. In the CPU 88, the input signal indicating the current is compared with the threshold value (for current value). When the input signal is larger than the threshold value, i.e., the current exceeds a limit, it is judged that the door glass is in its fully opened position or fully closed position. In such a case, the CPU 88 stops the output of ON signals to the transistors 26 and 28.

Further, in an the event a foreign object or substance is squeezed during the raising operation of the door glass, the variation amount of the driving current of the motor 12 is compared with the threshold value (for the variation amount of current). This threshold value is memorized in the RAM 90. When it is judged that input Signal indicating the variation amount is larger than the threshold value, the output of the ON signal to the first transistor 26 is stopped.

The differential waveform to be compared with the threshold value (for the variation amount of current) includes noise due to vibration, noise of the vehicle, and the noise from the engine. Such noises sometimes exceeds the threshold value. Therefore, if the CPU 88 recognizes that such conditions occur due to the squeezing of a foreign object or substance and stops the motor 12, the motor 12 is erroneously being stopped or reversed.

In the present embodiment, variations of the motor current which occur due to the above-mentioned noises are therefore discriminated from variations of the motor current which occur due to the squeezing of foreign objects or substances, and the motor 12 is not stopped or reversed when the variations of the current exceeds the threshold value (for variation amount of current) due to noise.

For example, if the vehicle is running on a bumpy road, the drive current violently varies in a time period as indicated by the arrow A in FIG. 4. Also, when the wheels of the vehicle fall into a depression on the road, the drive current also varies violently, as indicated by the arrow C in FIG. 6. When a door is violently closed, a similar variation of the drive current occurs, as indicated by the arrow B in FIG. 5.

As is understood from the characteristics shown in FIG. 4 through FIG. 6, a variation in the motor current always starts with a negative variation. On the other hand, a variation in the motor current due to the squeezing of a foreign object or substance starts with a positive variation, as shown in FIG. 3.

Accordingly, all current variations starting with a negative variation are considered noise, and the operation for inputting the current variation is canceled for a predetermined period of time, for example, a few hundred milliseconds without stopping or reversing the motor 12.

The operation of the present embodiment will now be described.

When the driver wants to raise the door glass manually, namely, in non-automatic mode, he or she manipulates the manual switch 30 for the raising operation, whereby the first coil 22 is excited to change over the movable contact of the first relay circuit 14 to contact the second contact 14C. At that time, the movable contact of the second relay circuit 16 is in contact with the first contact 16B. Therefore, the motor 12 rotates in the forward direction to raise the door glass. When the driver stops the manipulation of the manual switch 30 after the door glass is moved to a desired position, the motor 12 is stopped so that the raising of the door glass is stopped. On the other hand, when the driver wants to lower the door glass manually, he or she manipulates the manual switch 32 the lowering operation, whereby the second coil 22 is excited to change over the movable contact of the second relay circuit 16 to contact the second contact 16C. With this operation, the motor 12 is reversed so that the door glass is lowered.

When the driver manipulates the manual switch 30 for the raising operation using a large stroke, the auto switch 95 is brought into the ON state, along which the manual switch 30. The operation when the auto switch 95 is brought into the ON state will be explained.

Figure 2:
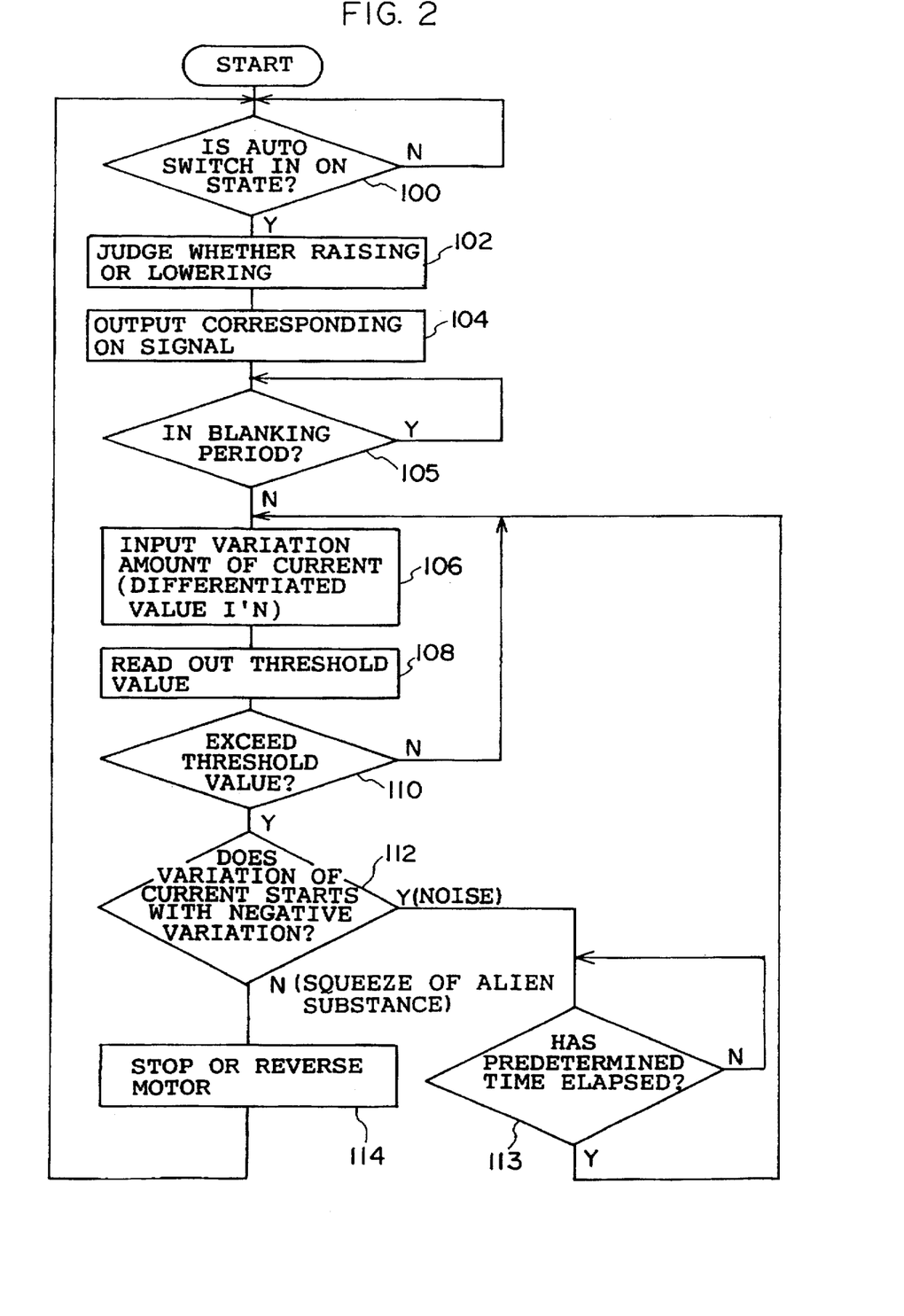
FIG. 2 is a flowchart showing the control operation.

When it is confirmed as in step 100 that the auto switch 95 is in the ON state, the processing moves to step 102 in which it is judged whether the door glass is to be raised or to be lowered. In step 104, an ON signal is outputted to the transistor 26 or 28 depending on the result of the Judgment in step 102. With this operation, even after the driver releases the manual switch 30 or 32, the excitation of the first coil 22 or the second coil 24 is continued so that the movement of the door glass is continued.

In the next step 105, it is judged that a predetermined blanking period has been reached. When the auto switch is brought into the ON-state, the drive current sometimes exceeds the threshold value (for the current value) due to a rush current, thereby causing an erroneous operation. Therefore, the processing in step 105 delays the comparison between the drive current and the corresponding threshold value for a predetermined period of time. When it is judged that the blanking period has elapsed, the processing moves to step 106 to input data indicating the variation amount of the drive current. The corresponding threshold value is also read out from the RAM 90 in the following step 108. In the next step 110, it is judged whether or not the variation amount exceeds the corresponding threshold value. When the result of the Judgment is negative, the output of the ON signal is continued, and the processing moves back to step 106 in which data indicating the variation amount of the drive current is again inputted, and the processing in steps 106, 108 and 110 are repeated. When it is judged that the variation amount exceeds the threshold value, the processing moves to step 112 in which it is judged whether or not the inputted variation of the current has started with a negative variation. When the result of the judgment is affirmative, the variation is regarded as noise which has occurred due to running on a bumpy road, the falling of a tire or wheel into a depression, the hard or violent closure of a door, or the starting of the engine. In these cases, the operation for the squeezing of a foreign objects or substance is canceled. In step 113, it is judged whether or not a predetermined period of time (for example, a few hundreds milliseconds) has elapsed. When it is judged that the predetermined period of time has elapsed, the processing moves back to step 106.

With this operation, when the variation amount of the drive current exceeds the corresponding threshold value due to the above-mentioned noise, it is possible to prevent the CPU 88 from erroneously judging that the condition is occurring due to the presence of a foreign object or substance, and to make the CPU 88 continue its ordinary operation.

When the result of the judgment in step 112 is negative, namely, it is judged that the variation of the drive current starts with a positive variation, it is recognized that the detected variation has occurred due to the squeezing of a foreign object or substance or to the full closure of the door glass. In such case, the processing moves to step 114, in which the output of the ON signal is stopped, and the processing moves to step 100.

As explained above, in the present embodiment, when it is judged that the variation amount of the drive current exceeds the corresponding threshold value, it is also judged whether an abnormal current occurs due to the actual squeezing of a foreign object or substance or due to noise, depending on the polarity of the initial variation, before judging that the current variation is abnormal. Therefore, it is possible to clearly discriminate the squeezing of a foreign object or substance from noise.

Although the above-mentioned embodiment is constituted to stop the motor 12 when a foreign object or substance is present, the embodiment may be modified to reverse the motor 12 for a predetermined period of time. In such a case, it becomes necessary to use a sensor for detecting the full closure of the door glass so as to discriminate a current increase due to the squeezing of a foreign object or substance from a current increase due to the full closure of the door glass.

What is claimed is:

1. An apparatus for controlling driving of a power window system in which a door glass of a vehicle is raised and lowered by driving power of a motor, comprising:

current variation obtaining means for obtaining a variation amount per unit time of a current flowing through said motor when said door glass is raised by said motor;

means for judging, after a predetermined blanking period, whether said variation amount of said current exceeds a predetermined value and whether said variation amount of said current is starts with a negative variation when variation of said current staffs; and drive control means for stopping or reversing said motor when said judging means judges that said variation amount of said current starts with a positive variation and for continuously driving the motor to raise the door glass so as to close the door glass when said judging means judges that the variation amount of said current is negative after a predetermined time has elapsed.

2. An apparatus for driving and controlling a power window system according to claim 1, wherein said variation amount of said current is obtained by differentiating the value of said current.

3. An apparatus for driving and controlling a power window system according to claim 1, further comprising means for canceling the input of said variation amount when the variation amount of said current is negative when the variation of said current starts.

4. An apparatus for driving and controlling a power window system according to claim 1, further comprising means for continuously canceling the input of said variation amount for a predetermined period of time when the variation amount of said current is negative when the variation of said current starts.

5. An apparatus for controlling driving of a power window system according to claim 4, wherein said predetermined period of time is a few hundreds milliseconds.

6. An apparatus for controlling driving of a power window system according to claim 1, further comprising a sensor for detecting the full closure of the door glass.

7. An apparatus for driving and controlling a power window system according to claim 1, wherein said drive control means reverses the motor for a predetermined period of time when the variation amount of said current exceeds a predetermined value and the variation amount of said current is positive when the variation of said current starts.

8. An apparatus for controlling driving of a power window system according to claim 1, wherein the variation amount of said current is judged as negative when noise occurs due to at least one of the vehicle running on a bumpy road, the falling of a tire of the vehicle into a depression of the road, the violent closure of a door of the vehicle, and the starting of the engine of the vehicle.

9. A method for driving and controlling a power window system in which a door glass of a vehicle is raised and lowered by the driving power of a motor, said method comprising the steps of:

obtaining a variation amount per unit time of a current detected flowing through said motor when said door glass is raised by said motor;

determining, after a predetermined blanking period, whether said variation amount of said current exceeds a predetermined value and whether said variation mount of said current starts with a negative variation when variation of said current starts;

one of stopping and reversing said motor when said variation amount of said current exceeds a predetermined value and said variation amount of said current starts with a positive variation; and driving continuously said motor to raise the door glass so as to close the door glass when said variation mount of said current exceeds a predetermined value and said variation mount of said current is negative after a predetermined time has elapsed.

10. A method of driving and controlling a power window system according to claim 9, wherein said variation of said current is obtained by differentiating the current.

11. A method of driving and controlling a power window system according to claim 9, wherein the obtaining of said variation mount is stopped when the variation mount of said current is negative when the variation of said current starts.

12. A method of driving and controlling a power window system according to claim 9, wherein the obtaining of said variation mount is continuously stopped for a predetermined period time when the variation mount of said current is negative when the variation of the current starts.

13. A method of driving and controlling a power window system according to claim 12, wherein said predetermined period of time is a few hundreds milliseconds.

14. A method of driving and controlling a power window system according to claim 9, further comprising the step of detecting the full closure of the door glass.

15. A method of driving and controlling a power window system according to claim 9, wherein the motor is reversed for a predetermined period of time when the variation mount of said current exceeds a predetermined value and the variation mount of said current is positive when the variation of the current starts.

16. A method for driving and controlling a power window system according to claim 9, wherein the variation amount of said current is judged as negative when noise occurs due to at least one of the vehicle running on a bumpy road, the falling of a tire of the vehicle into a depression of the road, the violent closure of a door of the vehicle, and the starting of the engine of the vehicle.

* * * * *